United States Patent
Rooms et al.

(10) Patent No.: US 8,810,891 B2
(45) Date of Patent: Aug. 19, 2014

(54) DEFORMABLE MIRROR WITH DISTRIBUTED STIFFNESS, TOOL AND METHOD FOR PRODUCING SUCH A MIRROR

(75) Inventors: Frédéric Rooms, Biviers (FR); Sébastien Camet, Meylan (FR); Jean-François Curis, Domène (FR)

(73) Assignee: UJF-Filiale, Gieres (FR)

( * ) Notice: Subject to any disclaimer, the term of this patent is extended or adjusted under 35 U.S.C. 154(b) by 271 days.

(21) Appl. No.: 12/740,057

(22) PCT Filed: Oct. 31, 2008

(86) PCT No.: PCT/FR2008/001542
§ 371 (c)(1), (2), (4) Date: Oct. 7, 2010

(87) PCT Pub. No.: WO2009/092901
PCT Pub. Date: Jul. 30, 2009

(65) Prior Publication Data
US 2011/0019295 A1 Jan. 27, 2011

(30) Foreign Application Priority Data
Nov. 2, 2007 (FR) ...................................... 07 07719

(51) Int. Cl.
*G02B 26/00* (2006.01)
*G02B 26/08* (2006.01)
*G02B 26/06* (2006.01)

(52) U.S. Cl.
CPC ............ *G02B 26/06* (2013.01); *G02B 26/0825* (2013.01)
USPC ......................................... 359/290; 359/859

(58) Field of Classification Search
USPC .................... 359/198.1, 224.1, 846, 290–292
See application file for complete search history.

(56) References Cited

U.S. PATENT DOCUMENTS

| 4,516,062 | A | * | 5/1985 | La Fiandra et al. ........... 318/676 |
| 5,166,818 | A | | 11/1992 | Chase et al. |
| 5,414,564 | A | | 5/1995 | Pausch et al. |
| 5,684,566 | A | * | 11/1997 | Stanton ........................... 355/67 |
| 5,831,780 | A | | 11/1998 | Krim |
| 6,724,517 | B2 | | 4/2004 | Bär et al. |
| 2005/0254111 | A1 | | 11/2005 | Griffith et al. |
| 2009/0059340 | A1 | | 3/2009 | Charton et al. |

FOREIGN PATENT DOCUMENTS

| EP | 0 561 190 | 9/1993 |
| EP | 0 744 641 | 11/1996 |
| FR | 2 757 277 | 6/1998 |
| FR | 2 813 677 | 3/2002 |

(Continued)

*Primary Examiner* — James Jones
(74) *Attorney, Agent, or Firm* — Harness, Dickey & Pierce, P.L.C.

(57) ABSTRACT

The present disclosure relates to a deformable mirror including a deformable membrane with a reflecting face and an opposite face, a stiff plate and a structure of at least one actuator at least a part of which is fixed to the stiff plate and able to locally deform the membrane, wherein the deformable mirror also includes a not necessarily uniform adhesive layer against the opposite surface of the membrane, and a structure of at least one flexible coupling including a mechanical connection and upper and lower linking means coupling respectively the upper and lower ends of the mechanical connection to the adhesive layer and to the stiff plate. The disclosure also relates to a tool and a method making it possible to produce such a mirror.

22 Claims, 10 Drawing Sheets

(56) References Cited

FOREIGN PATENT DOCUMENTS

| FR | 2 876 460 | 4/2006 |
| WO | WO 2005/040885 | 5/2005 |
| WO | WO 2005/050283 | 6/2005 |

* cited by examiner

DEFORMABLE MIRROR WITH DISTRIBUTED STIFFNESS, TOOL AND METHOD FOR PRODUCING SUCH A MIRROR

CROSS-REFERENCE TO RELATED APPLICATIONS

This application is a National Phase Entry of International Application No. PCT/FR2008/001542, filed on Oct. 31, 2008, which claims priority to French application Ser. No. 07/07719, filed on Nov. 2, 2007, both of which are incorporated by reference herein.

TECHNICAL FIELD

The present invention relates to a deformable mirror with distributed stiffness, a tool and a method for producing such a mirror. The present invention relates to the field of deformable mirrors with actuators or operators.

BACKGROUND

In the state of the art, deformable membrane mirrors are known which include a structure of actuators. Such mirrors are characterized by a resonance frequency which is reduced when the diameter of the membrane increases, which makes it impossible to produce deformable mirrors with a large diameter having significant performances as regards frequency response. The deformable mirrors according to the state of the prior art are limited accordingly to a compromise between the diameter of the membrane, the tension thereof and the resonance frequency thereof. As a matter of fact, it is necessary, in order to obtain a sufficient resonance frequency, to reduce the diameter or increase the tension of the membrane. This limitation results from the too important stiffness of the mirror, which does not sufficiently translate the vibration in a localised way upon the local deformation thereof.

In the state of the art, a solution has been provided which is described in the application for a patent WO 2005/050283 corresponding to a structure with actuators for the surface deformation, further comprising a deformable membrane, a mesh of actuators located opposite the face opposite the membrane, each actuator having an operating surface, a mesh of operating connections, with each operating connection being coupled to respectively an operating surface of one of the actuators of the mesh and respectively a point on the second surface opposite the operating surface, with each operating connection having an anisotropic stiffness and transmitting a motion which is perpendicular to the second surface. Although this solution makes it possible to optimise the membrane resonance frequency, it is difficult to implement. More particularly, the assembling of the various elements is made difficult, which implies high mechanical tolerances. Similarly, the deformable mirror according to this solution includes several blocks of elements. Finally, this solution requires the utilisation of a second deformable surface, which entails a non-negligible additional cost.

In the state of the art, a solution has been provided, which is described in the U.S. Pat. No. 5,831,780 and corresponds to a supporting system for a mirror including a base, a fine optical substrate having a first light collecting surface and an opposite rear surface, flexible means for coupling the rear surface of the substrate and the base together, and at least one actuator interposed in the flexible coupling means, connected between the base and the optical substrate in order to controllably modify the shape of said optical substrate, with said flexible coupling means including a flexible foundation which contains only partially at least one actuator. The main drawback of this solution is that the embodiment thereof is very difficult to implement. It cannot be applied but for mirrors having a diameter of the order of several tens of centimetres. The number of degrees of correction by the actuator is also low, since this solution only aims at compensating the deformations which the mirror would have undergone when it is sent into space. Then, the drawback of the prior art solutions lies in the impossibility, for a given diameter of the mirror, to obtain significant resonance frequencies while keeping a sufficient number of correction degrees and an easy production of the mirror.

SUMMARY

The object of the present invention is to remedy the drawbacks of the state of the art by providing a flexible structure offering a distribution of the stiffness of the membrane on the whole surface thereof, while enabling a simple assembling of all the composing elements of the deformable mirror and reducing the mechanical tolerance requirements at the level of the actuators. For this purpose, the present invention provides a deformable mirror including a deformable membrane with a reflecting face and an opposite face, a stiff plate and a structure of at least one actuator, at least a part of which is fixed to the stiff plate and able to deform the membrane, characterized in that the deformable mirror also includes a not necessarily uniform adhesive layer against the opposite surface of the membrane and a structure of at least one flexible coupling means including a mechanical connection means and upper and lower linking means coupling respectively the upper and lower ends of the mechanical connection means to the adhesive layer and to the stiff plate.

According to a particular embodiment of the invention, all the flexible coupling means are positioned between the actuators. According to another embodiment of the invention, at least one of the flexible coupling means 12 is positioned at the level of an actuator 9. According to another embodiment, all the flexible coupling means 12 are positioned at the level of the actuators 9.

Advantageously, the mechanical connection means of at least a part of the flexible coupling means is a stiff rod along an axis vertical to the surface of the stiff plate. Advantageously, a part of the flexible coupling means positioned at the level of the actuators also includes a second linking means separating at least a part of the actuator from the adhesive layer, with such second linking means being flexible. Advantageously, a part of such flexible coupling means positioned at the level of the actuators also includes a second means of mechanical connection separating the connection means and the adhesive layer, such second mechanical connection means being able to penetrate said adhesive layer. Preferably, the second mechanical connection means of at least a part of such flexible coupling means positioned at the level of the actuators is composed of a stiff rod along an axis vertical to the surface of the stiff plate.

According to a particular embodiment, at least a part of the flexible coupling means is fixed to a second stiff plate located under the first stiff plate, with said first stiff plate being drilled at the level of such said flexible coupling means. According to another particular embodiment, at least a part of the flexible coupling means positioned at the level of the actuators is fixed to a second stiff plate located under the first stiff plate, with the first stiff plate and the centres of the corresponding actuators, and fixed to the second stiff plate being drilled at the level of such said mechanical connection means. Advantageously, the lower linking means is composed of a layer of adhesive material applied to a hole drilled in the second stiff plate up to a depth which can be set beforehand.

According to one particular embodiment, at least a flexible coupling means includes an adjustable chamber between the mechanical connection means and the lower linking means. According to a first embodiment, each lower liking means is a stiff linking means composed of an adhesive material having a polymerization time above one minute and each upper linking means is a flexible connection means composed of an elastomer-adhesive material. According to a second embodiment, each lower linking means is a flexible linking means composed of an elastomer-adhesive material and each upper linking means is a stiff linking means composed of an adhesive material having a polymerization time over one minute. According to a third embodiment, each one of the lower and upper linking means is a flexible linking means composed of an elastomer-adhesive material.

The invention also provides a tool for producing such a deformable mirror, further including:
- a lighting device making it possible to create a parallel light beam;
- a wave front sensor;
- a splitting cube making it possible to split the direction of the light originating from the lighting device between the deformable mirror and the wave front sensor;
- a set-point unit;
- a computer capable of receiving data transmitted by the wave front sensor and the set-point unit;
- a control unit connected with said computer and able to separately control each actuator of the deformable mirror, so as to control the local deformation associated with each actuator of said deformable mirror.

The invention finally provides a method of pre-formation of such a deformable mirror using a producing tool successively including the following steps:
- the adhesive layer is fixed to the deformable membrane;
- the upper linking means is fixed to the adhesive layer;
- the upper end of each flexible coupling means is coupled to the adhesive layer through the upper connection means;
- the lower end of each flexible coupling means is fixed to at least one of the stiff plates through the lower stiff linking means, said lower stiff linking means being composed of an adhesive material having a polymerization time above one minute;
- during the polymerization of the adhesive material composing the lower stiff linking means, a closed loop controls and optimises the return forces of the actuators of the deformable mirror so as to pre-form the membrane of the mirror according to a pre-determined shape for the whole time of said polymerization.

It should be understood that one connection is flexible if the extension of such connection is superior or equal to 5 nanometres under the action of the force compatible with that that can be produced by the actuator. Such motion corresponds to one which can be observed in the state of the art of the wave front sensors. It should also be understood that a connection is stiff if such extension is smaller than 5 nanometres during the same period. The invention can be implemented with actuators or operators. Only actuators will be mentioned in the following.

BRIEF DESCRIPTION OF THE DRAWINGS

The invention will be better understood upon reading the following detailed description relating to non limitative exemplary embodiments, together with the appended drawings which respectively show.

DETAILED DESCRIPTION

Figure 1:
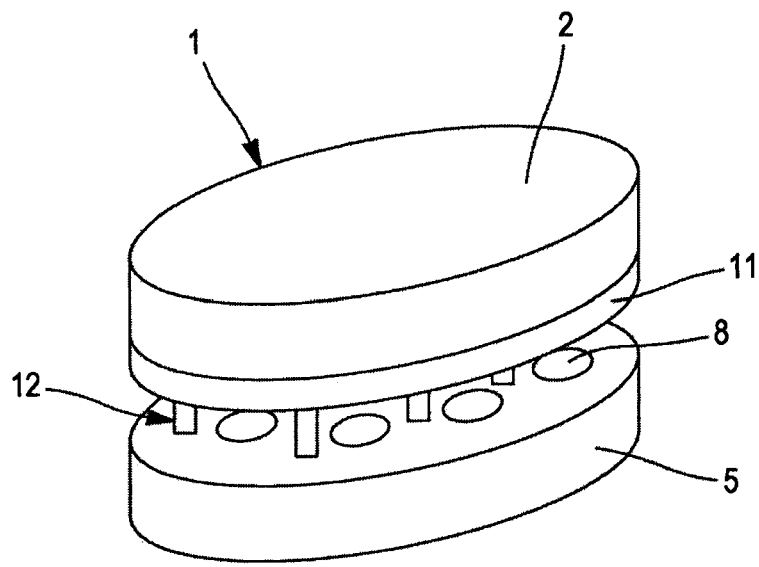
FIG. 1, a three-dimensional view of a deformable mirror according to a first embodiment of the invention with mechanical connection means to a rod about the actuators.
Figure 2:
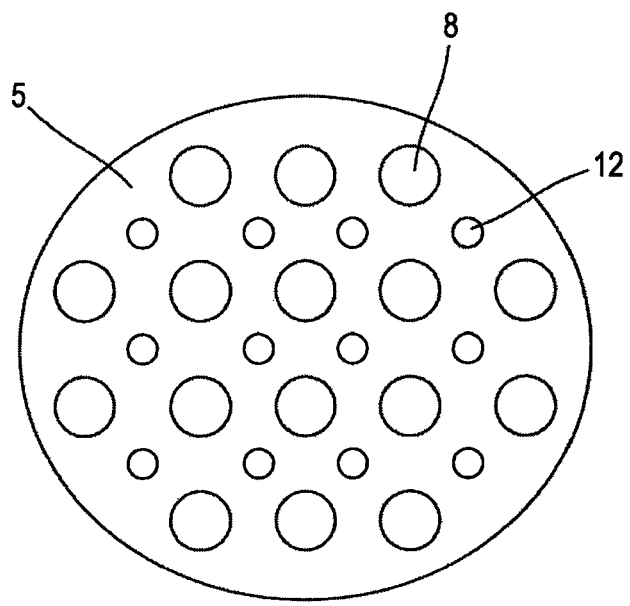
FIG. 2, a top view of a structure of magnetic actuators according to the first embodiment of the invention.
Figure 3:
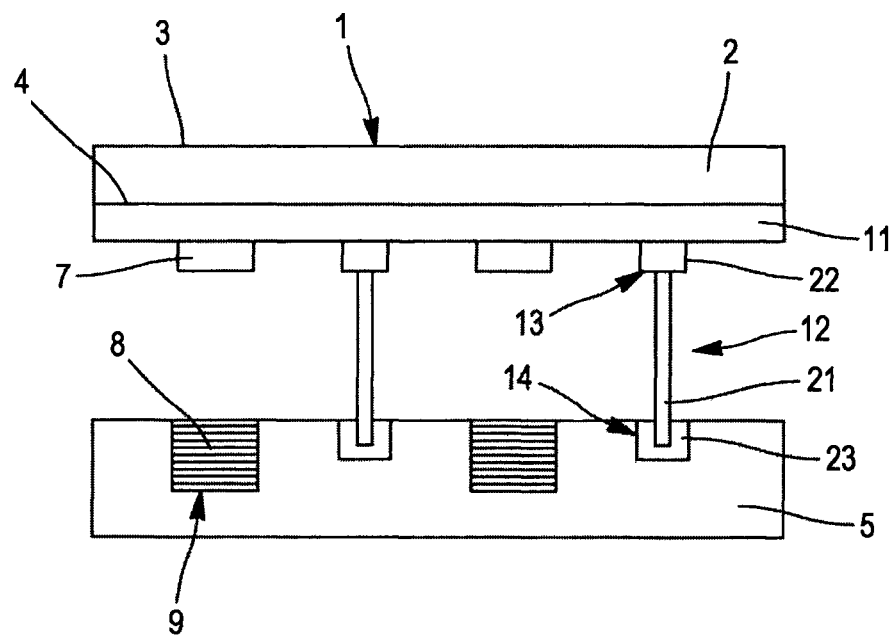
FIG. 3, a cross-sectional view of a deformable mirror according to the first embodiment of the invention.

FIGS. 1, 2 and 3 show views of a deformable mirror according to a first embodiment of the invention. This mirror 1 is composed of a deformable membrane 2, a stiff plate 5, a structure of magnetic actuators 9 and a structure of flexible coupling means 12.

The deformable membrane 2 is an optical substrate including two surfaces: a reflecting surface 3 and an opposite surface 4. In the present embodiment, the substrate is of the silicon type and the membrane 2 has a width of 20 µm. In another embodiment, it is of the Kapton type. The stiff plate 5 is a plate positioned parallel to the surface of the membrane 2 which is initially not deformed. It can for example be made of aluminium or any other material.

Each magnetic actuator 9 includes a magnet 7, a coil 8 and a device (not shown) controlling the magnetic field created by the coil 8. Each magnet 7 is integral with the membrane 2. Each coil 8 is fixed at least partially to the stiff plate 5 opposite the corresponding magnet 7. In this embodiment, the magnet 7 has a diameter of 850 µm and a thickness of 250 µm, the coils 8 having an external diameter of 1.7 mm.

Depending on the magnetic field created by the coil 8 in the vicinity of the magnet 7 and controlled by the user of the deformable mirror 1, said magnet 7 is attracted or pushed away with respect to said coil 8. The magnetic field causes the motion of the magnet 7 along the axis perpendicular to the surface of the stiff plate 5. Said magnet 7 being integral with the membrane 2, the latter is locally deformed at the level of the area covered by said magnet 7.

The device controlling the magnetic actuators operates in closed loop on a set point making it possible to give a particular shape to the membrane 2. Advantageously, the magnetic actuators 9 are positioned on the whole surface covering the deformable membrane 2 according to a uniformly distributed matrix. The influence of each of the actuators on the deformation of each one of the areas of the membrane 2 which correspond is thus identical. The influencing functions of the actuators thus have identical spatial extensions. The distance between the actuators amounts to 2.5 mm in this embodiment.

The adhesive layer 11 is applied against the opposite surface 4 of the membrane 2. It makes it possible both to solidify the membrane 2 and to fix each magnet 7 in order to easily produce the assembly of the various elements of the mirror. It is not necessarily uniform and indeed can be not homogeneous as a function of the pressure which is exerted thereon. The width thereof amounts to 100 µm in this embodiment.

This adhesive layer 11 is composed of a flexible adhesive material. This adhesive material is elastomer glue, the family of silicone or polyurethane glues of which corresponds to the needs thanks to their high resilience. Thus, the adhesive layer 11 is liable not to be homogeneous as a function of the forces which are applied against same.

Each flexible coupling mean 12 makes it possible, upon a local deformation of the membrane 2 by a magnetic actuator, to distribute the stiffness of the membrane so as to improve the frequency response thereof. Each flexible coupling means 12 makes it possible to obtain a flexible connection between the stiff plate 5 and the membrane 2. This flexible coupling means 12 has two ends therefore: an upper end 13 coupled to the membrane 2 and a lower end 14 coupled to the stiff plate 5. Each flexible coupling means 12 is positioned between the magnetic actuators.

More precisely, each flexible coupling means 12 includes a mechanical connection means 21, which is a stiff rod positioned along the axis vertical to the surface of the stiff plate 5. Each stiff rod has a diameter between 100 and 200 µm in this embodiment. Each flexible coupling means 12 also includes two upper 22 and lower 23 linking means positioned with respectively on the upper 13 and lower 14 ends thereof. The lower 23 linking means is stiff so as to lock the lower end 14 of said stiff rod 21.

Each stiff linking means 23 is embedded in a hole in the stiff plate 5 so as to release the tolerances along the rod. This stiff linking means 23 is composed of glue in which said stiff rod 21 is dipped. In another embodiment, the stiff linking means 23 is a glue pad fixed to the stiff plate 5.

This glue has a low heat dilatation so as to be protected against the heat dissipation in the coil 8 resulting from the Joule effect causing the motion of the rod 21 and thus an uncontrollable deformation of the membrane 2. It also has a high polymerization time, which makes it possible to shape the membrane 2 before said glue hardens. This makes it possible to release the constraints on the geometrical tolerances.

Such glue belongs to the family of the "epoxy" glues known for their low heat expansion. More particularly, it has a polymerization time above one minute so as to make it possible to assemble elements and to give a particular initial shape to the mirror. The glue is initially placed into the hole of the stiff plate 5, a polymerization then occurs when the stiff rod is dipped into the glue.

The lower linking means 22 is flexible so as to provide a mechanical return function. For this purpose, said flexible linking means 22 is a pad of adhesive material. Such adhesive material is flexible glue, the family of silicone or polyurethane of which corresponds to the needs because of the high resiliency thereof.

The force of the mechanical return of the spring composed of the glue can be easily set through the diameter of the rod. As a matter of fact, the force of the return is proportional to the contact surface: the weaker the contact surface and the greater the displacement of the membrane 2 is, and to other constant parameters of glues (thickness, strength of the actuator, etc.). This mechanical return force is also set by the quantity of glue having other constant parameters. As a matter of fact, the travel increases when the quantity of glue increases since the material is flexible and consequently the thicker the glue pad the greater the deformation for the same relative extension (the stiffness of the spring also decreases).

The mechanical connection means composing the structure of the flexible coupling of the mirror offers the advantage of being easily reproducible and of enabling more localised deformations. The present embodiment also makes it possible to increase the travel between the actuators while reducing the mechanical coupling. In addition, it makes it possible to increase the resonance frequency of the membrane significantly while preserving the linearity of the mirror, the resonance frequency (with a constant material) depending only on the distance between the rods and no longer on the dimensions of the mirror.

Figure 4:
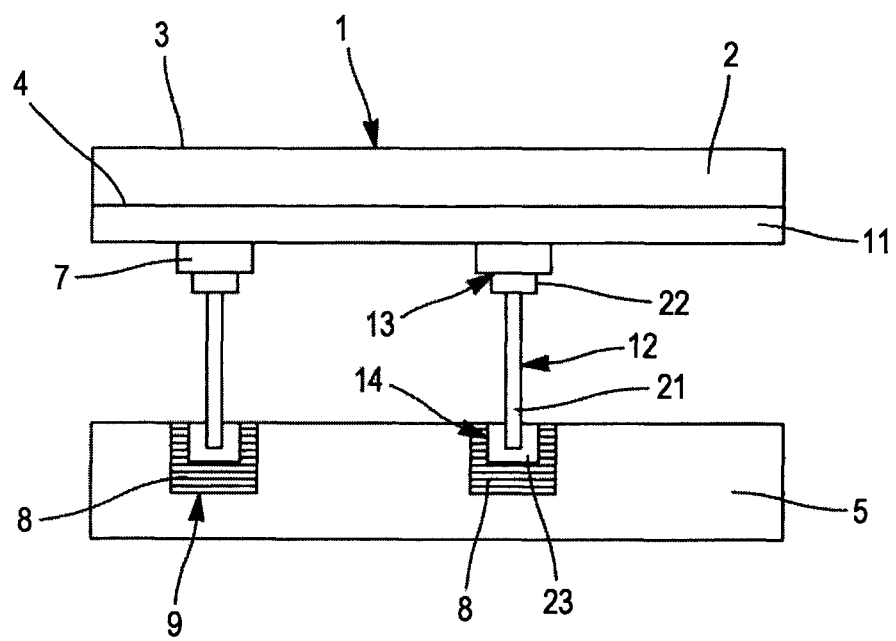
FIG. 4, a cross-sectional view of a deformable mirror according to a second embodiment of the invention, with means for the mechanical connection to a rod against the actuators.

FIG. 4 shows a cross-sectional view of a deformable mirror according to a second embodiment of the invention. Such a mirror 1 is different from the mirror according to the first embodiment in that the flexible coupling means 12 is no longer positioned about the magnetic actuators 9 but at the level thereof.

The upper 22 linking means is directly applied under the magnet 7 and the upper end of the stiff rod 21 is fixed thereon so as to provide a mechanical return function. The lower 23 linking means is embedded into the coil 8. As a matter of fact, the coils 8 have no copper wire at the centre. Then a hole is drilled at the centre of said coil 8 and the glue is initially placed in the hole of the coil 8, then polymerization occurs when the stiff rod is dipped into said glue.

A deformable mirror 1 according to this embodiment has improved performances as regards the spatial extension of the influencing functions. This improvement results from the fact that the removal force is located at the same place as the application force. Then, it is easier to avoid a local deformation of the membrane at the level of the rod with respect to the mirror according to the first embodiment of the invention.

Figure 5:
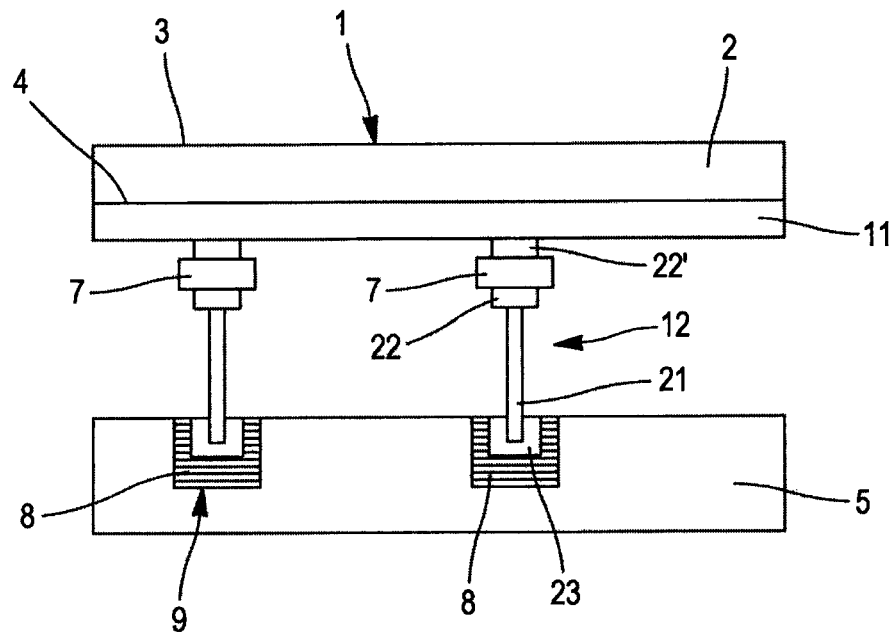
FIG. 5, a cross-sectional view of a deformable mirror according to a third embodiment of the invention, with mechanical connection means including a double layer of flexible glue.

FIG. 5 shows a cross-sectional view of a deformable mirror according to a third embodiment of the invention. Such a mirror 1 is different from the mirror according to the second embodiment in that the second flexible linking means 22' is positioned between the magnet 7 and the adhesive layer 11. This embodiment uses a double layer of flexible glue 22, 22' surrounding the magnet 7 which makes it possible to increase the deformation of the membrane 2 while keeping the other parameters of the mirror 1 constant.

Figure 6:
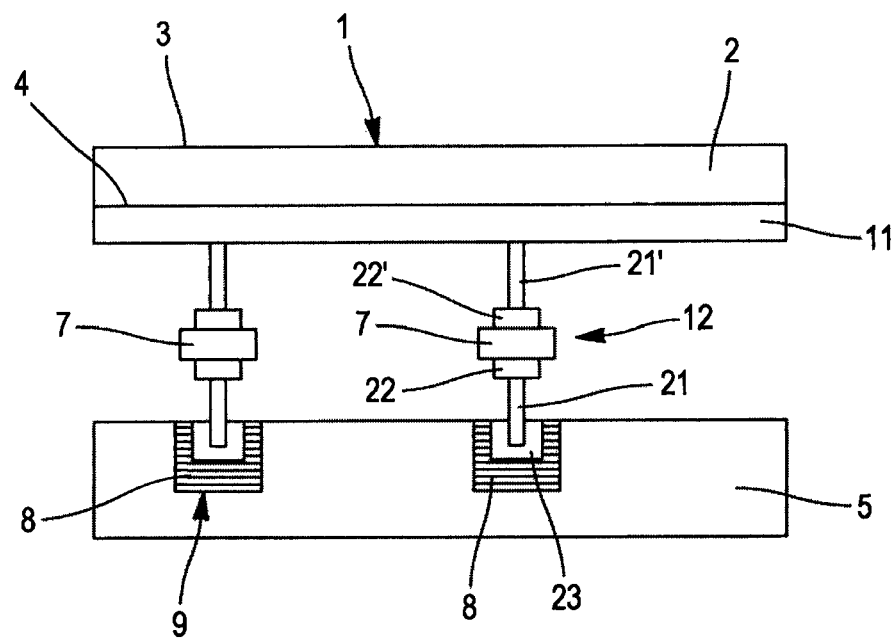
FIG. 6, a cross-sectional view of a deformable mirror according to a fourth embodiment according to the invention, with mechanical, two-rod connection means.

FIG. 6 shows a cross-sectional view of a deformable mirror according to a fourth embodiment of the invention. Such a mirror 1 is different from the mirror according to the third embodiment in that the second stiff rod 21' is placed between the second flexible linking means 22' and the adhesive layer 11. Advantageously, the first and second stiff rods 21, 21' have the same lengths.

The present invention according to this embodiment is distinguished in that the stiff rod 21' directly penetrates said adhesive layer 11. Then, this embodiment makes it possible to reduce the print-effect on the membrane 2 since the print of the second stiff rod 21' is lower than that of the magnet 7. The double flexible link of glue makes it possible to increase the deformation of said membrane 2.

Figure 7:
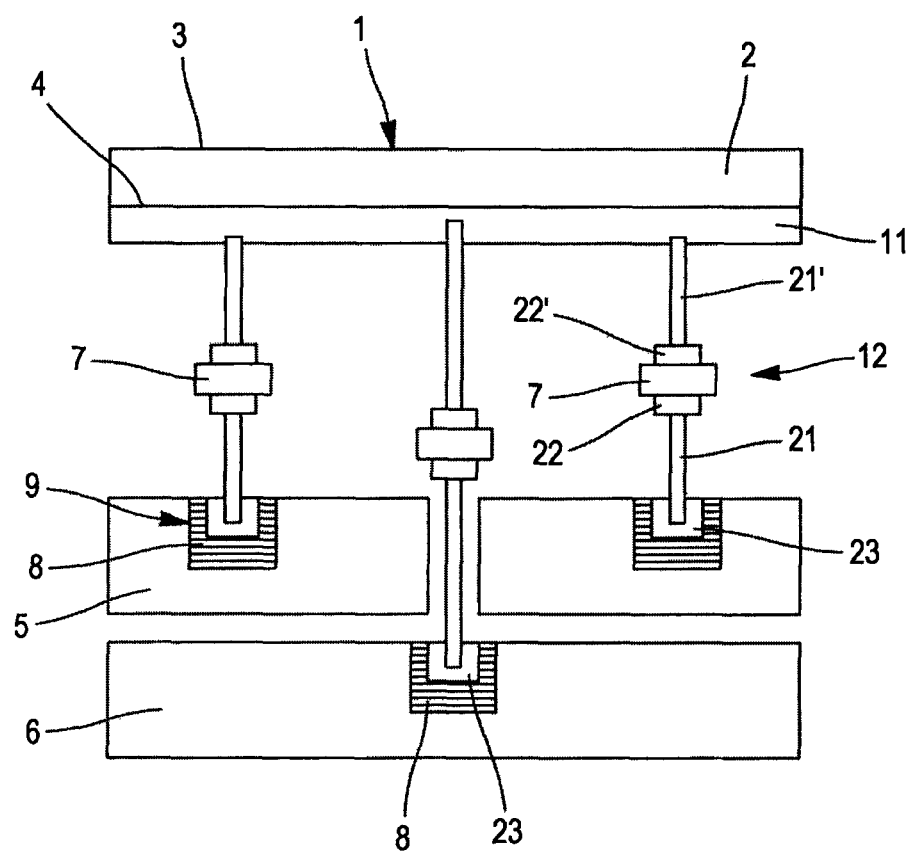
FIG. 7, a cross-sectional view of a deformable mirror according to a fifth embodiment of the invention, with the actuators and the corresponding mechanical connection means distributed on two stiff plates.

FIG. 7 shows a cross-sectional view of a deformable mirror according to a fifth embodiment of the invention. Such a mirror 1 is different from the mirror according to the fourth embodiment in that a second stiff plate 6 is positioned under the first stiff plate 5. This second stiff plate 6 also contains coils 8 with a magnetic actuator structure which stiff rods 21 are fixed on. The first stiff plate 5 has holes drilled for this purpose at the level of each flexible coupling means 12 connected to the second stiff plate 6.

This embodiment makes it possible to distribute the coils 8 on two levels and thus to reduce the distances between the actuators. Advantageously, the actuators can be positioned on a number of plates above two, so that said actuators are even closer to each other. A limitation although appears as regards the number of stiff plates since then the length of the stiff rods becomes significant and some warping may occur. Eventually, in an advantageous way, the magnets 7 are positioned at different heights with respect to the membrane 2 which makes it possible to reduce the overall dimensions and thus to reduce the distance between the actuators.

Figure 8:
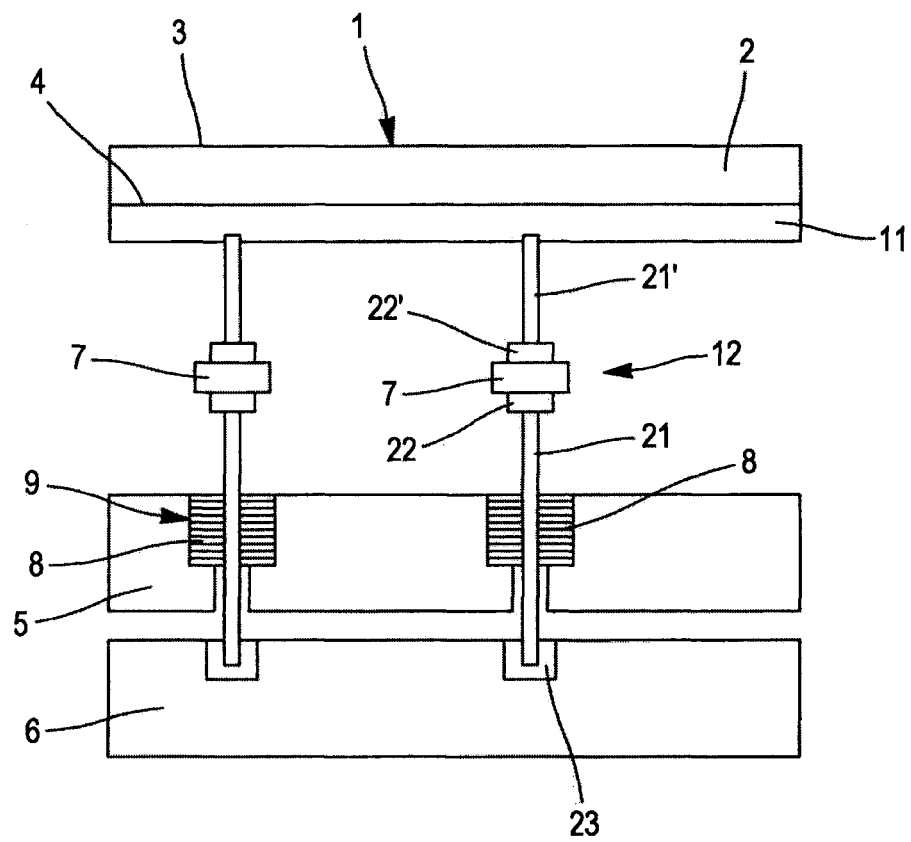
FIG. 8, a cross-sectional view of a deformable mirror according to a sixth embodiment of the invention, with the lower ends of means for the mechanical connection to two rods under the actuators.

FIG. 8 shows a cross-sectional view of a deformable mirror according to a sixth embodiment of the invention. Such a mirror 1 is different from the mirror according to the fourth embodiment in that the lower end 14 of the flexible coupling means 12 is fixed not to the first plate 5 but to the second plate 6 which is located under said plate 5.

For this purpose, the coil 8 is drilled along the axis perpendicular to the surface of the first stiff plate 5 and said first stiff plate 5 is also drilled further down the drill of said coil 8. The first stiff rod 21 thus goes through the first plate 5 and the coil 8. The coupling to the second plate 6 of the lower end 14 of the second flexible coupling 12 is obtained through a stiff linking means 23 according to the previous embodiments. A mirror 1 according to this embodiment has the advantage of placing the linking points 23 away from the mechanical connection means 21 with respect to the heat dissipation area about the coil 8. The heat dilation phenomenons are thus reduced significantly.

Figure 9:
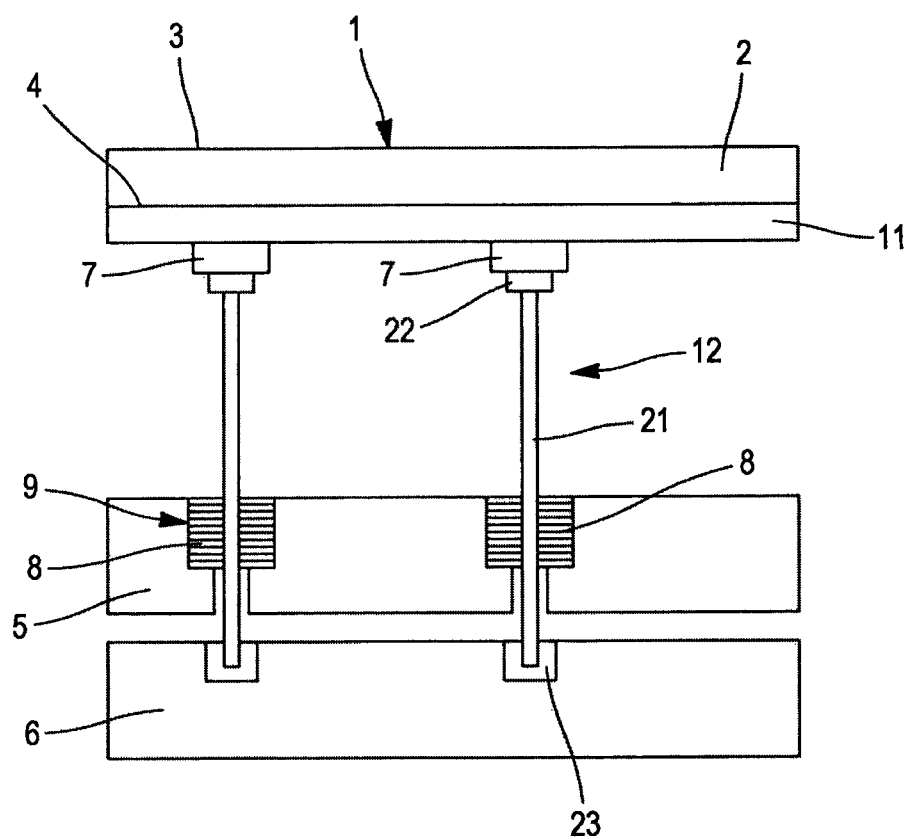
FIG. 9, a cross-sectional view of a deformable mirror according to a seventh embodiment of the invention, with the lower ends of means for the mechanical connection to a rod under the actuators.

FIG. 9 shows a cross-sectional view of a deformable mirror according to a seventh embodiment of the invention. This embodiment includes the characteristics of the previous embodiment applied to a deformable mirror 1 the flexible coupling means 12 of which includes only one stiff rod 21 according, for example, to the second embodiment.

Figure 10:
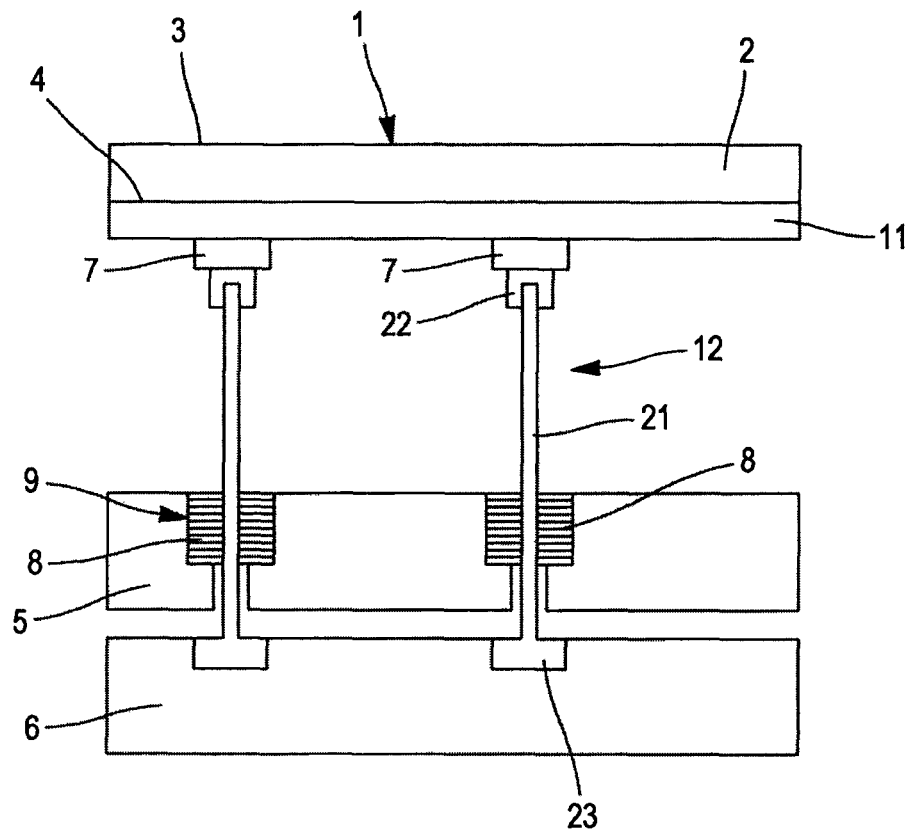
FIG. 10, a cross-sectional view of a deformable mirror conformable to an eighth embodiment of the invention, with the stiff upper linking means and the flexible lower linking means.

FIG. 10 shows a cross-sectional view of a deformable mirror according to an eighth embodiment of the invention. This embodiment is analogous to the previous embodiment of the present invention. The difference lies in the linking means 22, 23.

As a matter of fact, the lower 23 linking means and the upper 22 linking means are respectively stiff and flexible. The characteristics of the linking means 22, 23 are thus reversed with respect to the previous embodiments. In other particular embodiments, the characteristics of the linking means 22, 23 are reversed in each one of the other embodiments described.

Figure 11:
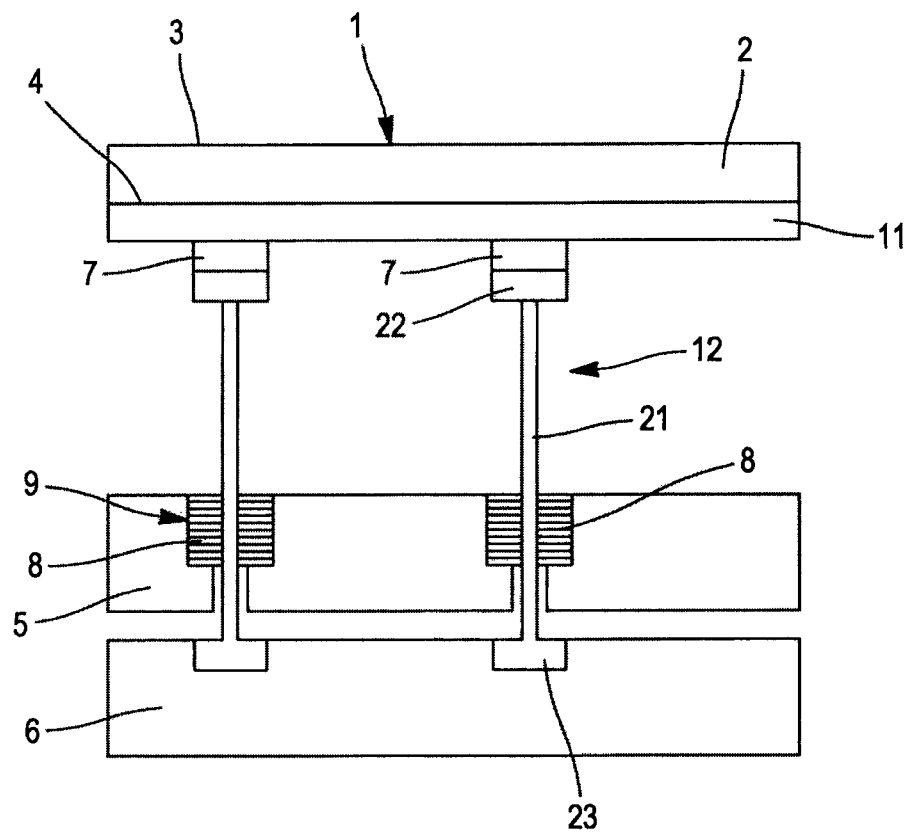
FIG. 11, a cross-sectional view of a deformable mirror according to a ninth embodiment of the invention with upper and lower flexible linking means.

FIG. 11 shows a cross-sectional view of a deformable mirror according to a ninth embodiment of the invention. This embodiment is analogous to the previous embodiment of the present invention. The difference lies in the linking means 22, 23. As a matter of fact, the lower linking means 23 and upper 22 linking means are respectively flexible. In other particular embodiments of the invention 23, the linking means 22, 23 are flexible in each one of the other embodiments described.

Figure 12:
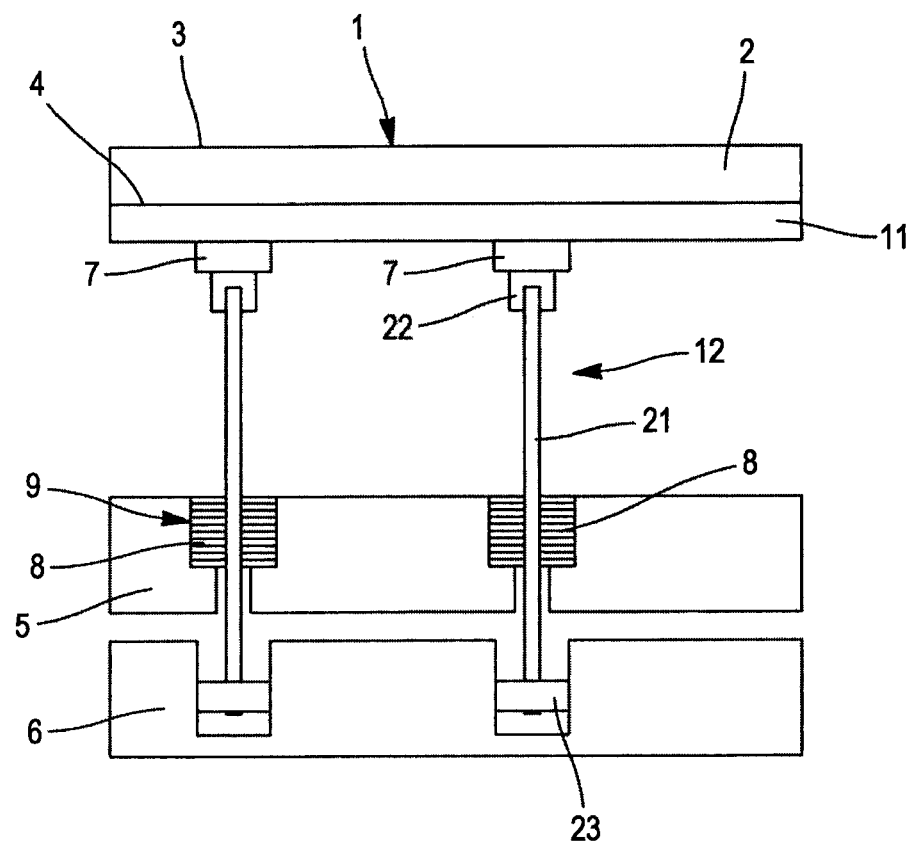
FIG. 12, a cross-sectional view of a deformable mirror according to a tenth embodiment of the invention with a depth of a flexible glue set beforehand.

FIG. 12 shows a cross-sectional view of a deformable mirror according to a tenth embodiment of the invention. This embodiment is analogous to the eighth embodiment of the present invention. The difference lies in the flexible linking means 22.

Said flexible linking means 22 is composed of a hole drilled in the second stiff plate 6. The hole is not integrally filled with flexible adhesive material since the latter is positioned at a certain depth which is set beforehand. Contrarily to the previous embodiments wherein the work is carried out in traction/compression, the glue is positioned on the rod and this embodiment enables a shearing work. The return force is then proportional to the contact surface, thus the diameter of the rod and the height of the glue pad.

This embodiment thus makes the return force of the actuator parameterizable while controlling the thickness of the adhesive material. In addition, it is thus possible to modify the travels of each actuator. As a matter of fact, in a circular membrane, the travels are also smaller close to the edges because of the mechanical connections. Thus, the applications of weaker connections on the edges and in the centre make it possible to increase the homogeneity of the travels of each one of the actuators.

In another embodiment, at least a part of the stiff rod is fixed to the hydraulic or gaseous chamber located under the corresponding rod and making it possible to constraint the shape of the deformable membrane. In one advantageous embodiment of the present invention, the magnetic actuators matrix is separated from the stiff plate 5 so that the deformable membrane 2 only is fixed to said stiff plate 5. This embodiment has the advantage of making a customised production possible of the shape of the deformable mirror which corresponds to a precise specification.

Figure 13:
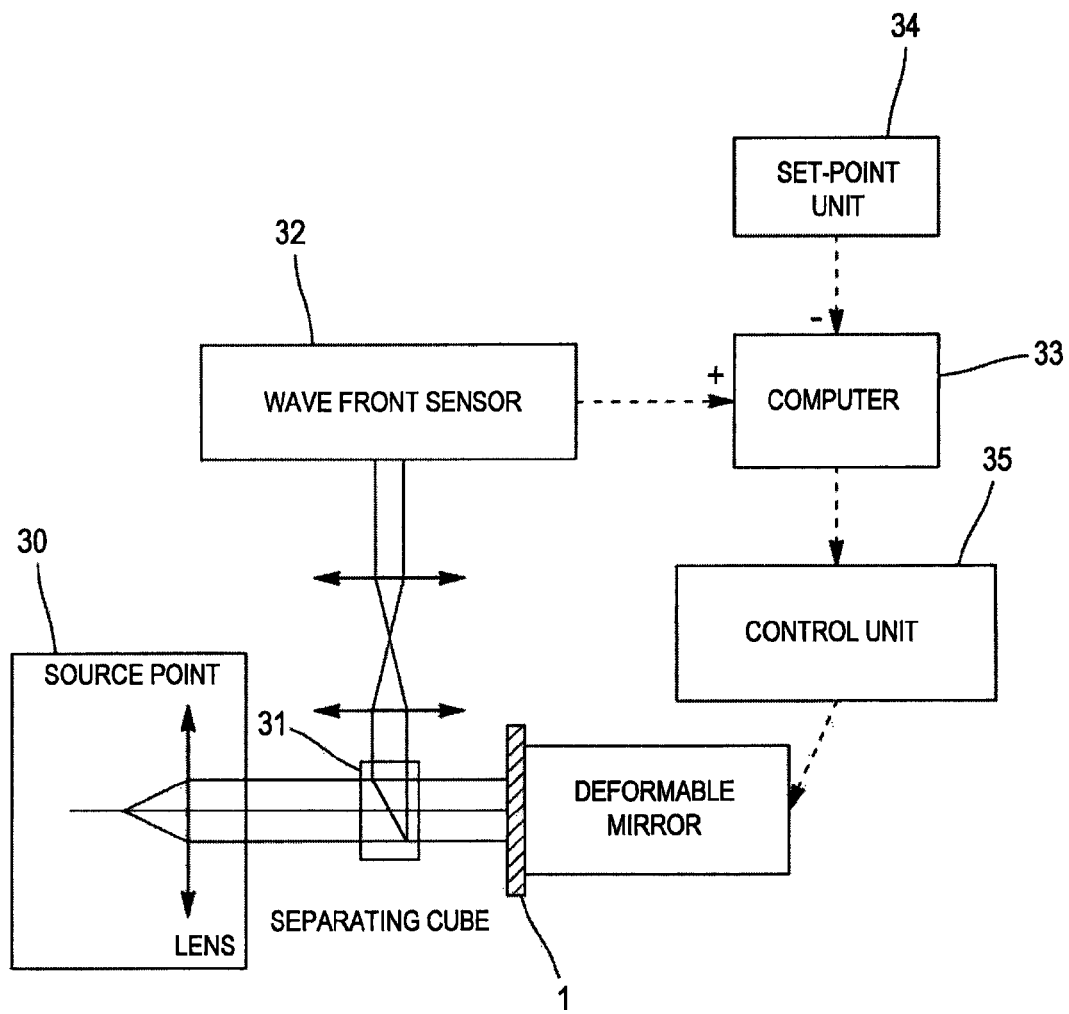
FIG. 13, a device making it possible to produce and control a deformable mirror according to the invention.

FIG. 13 illustrates a tool for producing a deformable mirror according to any one of the above-mentioned embodiments. This production tool includes:
- a lighting device 30 making it possible to generate a parallel light beam;
- a wave font sensor 31;
- a splitting cube 32 making it possible to split the direction of the light originating from the lighting device between the deformable mirror 1 and the wave front sensor 31;
- a set-point unit 33;
- a computer 34 capable of receiving data transmitted by the wave front sensor 32 and the set-point unit 33;
- a control unit 35 connected with said computer and able to separately control each actuator of the deformable mirror 1 so as to control the local deformation associated with each actuator of said deformable mirror 1.

A method making it possible to pre-form a deformable mirror 1 according to any one of the above-mentioned embodiments, uses a production tool according to the one also described here-above. It requires using a lower linking means 23 which is stiff and made up of an adhesive material having a polymerization time above one minute. It includes the successive following steps:
- the adhesive layer 11 is fixed to the deformable membrane 2;
- the upper 22 connection means is fixed to the adhesive layer;

the upper end 13 of each flexible coupling means 12 is coupled to the adhesive layer 11 through the upper linking means 22;

the lower end 14 of each flexible coupling means 12 is fixed to at least one of the stiff plates 5, 6 through the lower stiff linking means 23, said lower stiff linking means 23 being composed of an adhesive material having a polymerization time above one minute;

during the polymerization of the adhesive material composing the lower stiff linking means, a closed loop controls and optimises the return forces of the actuators must be deformable so as to pre-form the membrane of the mirror according to a predetermined shape for the whole time of said polymerization.

According to the embodiments mentioned above of the mirror, the glue providing the stiff link 23 has a polymerization time of a few minutes. This time can be from one minute to three hours depending on the time required for the installation and calibration of the deformable mirror and more particularly the time of measurements of control and interaction matrices used.

This method, and the device it implements, makes it possible for example to have a mirror in a plane shape without having to control it. This makes it possible to remedy a drawback of magnetic deformable mirrors with a membrane of the state of the art which is known for inducing aberrations when at rest, which makes it difficult to obtain optical alignments. In addition, once polymerization is completed, this shape is obtained passively, which means without consuming energy and without any computer.

Such a method of production can cleverly be implemented to provide mirrors having any fixed shape. The magnets are glued to the membrane and the shape of the mirror is imparted by the forces applied during the polymerization. The coils are also fixed to the stiff plate, nevertheless once the fixed shape of the mirror is obtained, they are no longer useful. Thus, advantageously, the coils of the structure of the actuators can be positioned on a comb-shaped element, with the element being able to be introduced into and removed from the stiff plate. This makes it possible to save the cost of the coils.

The embodiment described here-above of the present invention are given as examples and are not limitative. It is well understood that the persons skilled in the art may provide various alternative solutions as well as various combinations of such embodiments of the invention without leaving the scope of the invention. Thus, the previously described embodiments are applied identically to non-magnetic actuators, for example mechanical and piezzo-electric actuators as well as any combination of actuators of various types. Finally, the invention may be implemented to give an initial shape to the mirror during the step of polymerization of stiff links, this shape being modifiable afterwards or fixed once and for all.

The invention claimed is:

1. A deformable mirror comprising:
    a deformable membrane with a reflecting face and an opposite face;
    a stiff plate;
    a structure of at least one magnetic actuator including a magnet and a coil, at least a first part of said actuator being fixed to the stiff plate and able to locally deform the membrane with respect to a magnetic field created by the coil in the vicinity of the magnet;
    an adhesive layer against the opposite surface of the membrane; and
    a structure of at least one flexible coupling further comprising a mechanical connection and upper and lower links coupling respectively the upper and lower ends of the mechanical connection to the adhesive layer and to the stiff plate, at least one of the upper or lower links being flexible and providing a perpendicularly oriented mechanical return function between the stiff plate and the deformable membrane, wherein the lower link couples the lower end of the mechanical connection to the stiff plate independent of at least a second part of said actuator.

2. A deformable mirror according to claim 1, further comprising a plurality of actuators and a plurality of flexible couplings positioned between the actuators.

3. A deformable mirror according to claim 1, wherein the flexible coupling is positioned at the level of an actuator.

4. A deformable mirror according to claim 2 wherein the plurality of flexible couplings are all positioned at the level of the actuators.

5. A deformable mirror according to claim 1, wherein the mechanical connection of at least a part of the flexible coupling is a stiff rod along an axis vertical to the surface of the stiff plate.

6. A deformable mirror according to claim 3, wherein at least a part of the flexible coupling positioned at the level of the actuators also includes a second linking means separating at least a part of the actuator from the adhesive layer, with the second linking means being flexible.

7. A deformable mirror according to claim 1, wherein at least a part of the flexible coupling is positioned at a level of the actuator and includes a second mechanical connection means separating the upper link from the adhesive layer, with the upper end of the flexible coupling thus being able to penetrate the adhesive layer.

8. A deformable mirror according to claim 7, wherein the second mechanical connection means of at least a part of such flexible coupling positioned at the level of the actuators is composed of a stiff rod along an axis vertical to the surface of the stiff plate.

9. A deformable mirror according to claim 3, wherein at least a part of the flexible coupling is fixed to a second stiff plate located under the first stiff plate, the first stiff plate being drilled at the level of the such said flexible coupling.

10. A deformable mirror according to claim 3, wherein at least a part of the flexible coupling positioned at the level of the actuators is fixed to a second stiff plate positioned under the first stiff plate, with the first stiff plate and the centers of the corresponding actuators fixed to the second stiff plate being drilled at the level of the mechanical connection.

11. A deformable mirror comprising:
    a deformable membrane with a reflecting face and an opposite face;
    a stiff plate;
    a structure of at least one magnetic actuator including a magnet and a coil, at least a part of said actuator being fixed to the stiff plate and able to locally deform the membrane with respect to a magnetic field created by the coil in the vicinity of the magnet;
    an adhesive layer against the opposite surface of the membrane; and
    a structure of at least one flexible coupling further comprising a mechanical connection and upper and lower links coupling respectively the upper and lower ends of the mechanical connection to the adhesive layer and to the stiff plate, at least one of the upper or lower links being flexible and providing a perpendicularly oriented mechanical return function between the stiff plate and the deformable membrane, wherein the lower link further comprises a layer of an adhesive material applied into a hole drilled in the second stiff plate up to a predetermined depth.

12. A deformable mirror according to claim 3, wherein at least one flexible coupling defines an adjustable chamber between the mechanical connection and the lower link.

13. A deformable mirror according to claim 1, wherein each lower link is stiff and includes an adhesive material having a polymerization time above one minute and each upper link is flexible and includes an elastomer-adhesive material.

14. A deformable mirror according to claim 1, wherein the lower connection is flexible and includes an elastomer-adhesive material and the upper link is stiff and includes an adhesive material having a polymerization time above one minute.

15. A deformable mirror according to claim 1, wherein each lower link is flexible and includes an elastomer-adhesive material, and each upper link includes the adhesive layer that at least one of the mechanical connection is able to penetrate.

16. A deformable mirror according to claim 1, wherein the lower and upper links are flexible and include an elastomer-adhesive material.

17. A tool for producing a deformable mirror according to claim 1, further comprising:
    a lighting device making it possible to obtain a parallel light beam;
    a wave front sensor;
    a splitting cube making it impossible to split the direction of the light originating from the lighting device between the deformable mirror and the wave front sensor;
    a set-point unit;
    a computer capable of receiving data transmitted by the wave front sensor and the set-point unit; and
    a control unit linked with the computer and able to separately control each actuator of the deformable mirror so as to control the local deformation associated with each actuator of the deformable mirror.

18. A deformable mirror according to claim 1 wherein
    the lower link includes an adhesive material having a polymerization time above one minute; and
    a closed loop controller which optimizes return forces of actuators of the deformable mirror, so as to pre-form the mirror membrane according to a predetermined shape for the whole time of the polymerization.

19. A deformable mirror according to claim 1, wherein adhesive layer has a non-uniform thickness.

20. A deformable mirror comprising:
    a deformable membrane with a reflecting surface and an opposite surface;
    an adhesive layer disposed against the opposite surface of the membrane;
    a stiff plate;
    an actuator that is fixed to the stiff plate and able to locally deform the membrane; and
    a flexible coupling including a mechanical connection and upper and lower links respectively coupling upper and lower ends of the mechanical connection to the adhesive layer and to the stiff plate, the upper link being flexible in a direction extending between the stiff plate and the deformable membrane.

21. A deformable mirror comprising:
    a deformable membrane with a reflecting surface and an opposite surface;
    an adhesive layer disposed against the opposite surface of the membrane;
    a stiff plate;
    an actuator that is fixed to the stiff plate and able to locally deform the membrane; and
    a flexible coupling that couples the adhesive layer to the stiff plate, wherein the flexible coupling is not in-line with the actuator.

22. A deformable mirror comprising:
    a deformable membrane with a reflecting surface and an opposite surface;
    an adhesive layer disposed against the opposite surface of the membrane;
    a stiff plate;
    an actuator disposed between the adhesive layer and the stiff plate and able to locally deform the membrane; and
    a flexible coupling that directly couples the adhesive layer to the stiff plate.

* * * * *